US009723230B2

(12) United States Patent
Menon

(10) Patent No.: US 9,723,230 B2
(45) Date of Patent: Aug. 1, 2017

(54) MULTI-SPECTRAL IMAGING WITH DIFFRACTIVE OPTICS

(71) Applicant: University of Utah Research Foundation, Salt Lake City, UT (US)

(72) Inventor: Rajesh Menon, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 717 days.

(21) Appl. No.: 14/092,722

(22) Filed: Nov. 27, 2013

(65) Prior Publication Data

US 2014/0152839 A1    Jun. 5, 2014

Related U.S. Application Data

(60) Provisional application No. 61/732,205, filed on Nov. 30, 2012.

(51) Int. Cl.
| | | |
|---|---|---|
| *H04N 5/33* | (2006.01) |
| *G01J 3/18* | (2006.01) |
| *H04N 5/32* | (2006.01) |
| *G01J 3/28* | (2006.01) |
| *G01J 3/36* | (2006.01) |
| *H04N 9/04* | (2006.01) |
| *H04N 9/09* | (2006.01) |

(52) U.S. Cl.
CPC ............. *H04N 5/332* (2013.01); *G01J 3/18* (2013.01); *G01J 3/2823* (2013.01); *G01J 3/36* (2013.01); *H04N 5/32* (2013.01); *H04N 5/33* (2013.01); *H04N 9/045* (2013.01); *H04N 9/09* (2013.01); *G01J 2003/1876* (2013.01)

(58) Field of Classification Search
CPC .. H04N 5/332; H04N 5/33; H04N 5/32; G01J 3/18
See application file for complete search history.

(56) References Cited

U.S. PATENT DOCUMENTS

| 5,867,264 A | 2/1999 | Hinnrichs |
| 6,015,950 A | 1/2000 | Converse |

(Continued)

FOREIGN PATENT DOCUMENTS

| GB | 2258780 | 2/1993 |
| WO | WO 2009/017348 | 2/2009 |

OTHER PUBLICATIONS

Andrews et al.; "Confining Light to Deep Subwavelength Dimensions to Enable Optical Nanopatterning;" Science, vol. 324, May 15, 2009 pp. 917-920.

(Continued)

*Primary Examiner* — Shawn An
(74) *Attorney, Agent, or Firm* — Thorpe North & Western, LLP

(57) ABSTRACT

A multi-spectral imaging (MSI) device can include an imaging plane and a diffractive optic. The imaging plane can include at least two groups of pixels an array of pixels for sensing at least two spectral bands. The at least two spectral bands can include a first spectral band and a second spectral band. The diffractive optic can be configured for diffracting an electromagnetic wave into the at least two spectral bands and focusing each spectral band component of the electromagnetic wave onto the group of pixels for the spectral band to generate an image.

6 Claims, 13 Drawing Sheets

(56) References Cited

U.S. PATENT DOCUMENTS

| | | | |
|---|---|---|---|
| 6,552,321 B1 | 4/2003 | Mills | |
| 7,135,698 B2 | 11/2006 | Mitra | |
| 7,265,350 B2 | 9/2007 | Fauci et al. | |
| 7,391,388 B2 | 6/2008 | Schultz | |
| 7,666,580 B2 | 2/2010 | Menon et al. | |
| 7,667,819 B2 | 2/2010 | Menon et al. | |
| 7,713,684 B2 | 5/2010 | Menon et al. | |
| 7,714,988 B2 | 5/2010 | Menon et al. | |
| 7,989,151 B2 | 8/2011 | Menon | |
| 8,143,601 B2 | 3/2012 | Menon et al. | |
| 8,288,702 B2 | 10/2012 | Veeder | |
| 8,331,032 B2* | 12/2012 | Heimer | G01J 3/02 359/630 |
| 2003/0086091 A1 | 5/2003 | Hinnrichs et al. | |
| 2004/0096118 A1* | 5/2004 | Liang | G01J 3/2823 382/284 |
| 2009/0059224 A1 | 3/2009 | Imura | |
| 2010/0051809 A1 | 3/2010 | Onat et al. | |
| 2010/0095999 A1 | 4/2010 | Menon | |
| 2010/0248159 A1 | 9/2010 | Menon et al. | |
| 2010/0296143 A1 | 11/2010 | Reichelt et al. | |
| 2010/0328659 A1 | 12/2010 | Bodkin | |
| 2011/0062334 A1 | 3/2011 | Ben-Bassat | |
| 2011/0080487 A1* | 4/2011 | Venkataraman | H04N 5/2253 348/218.1 |
| 2012/0199689 A1 | 8/2012 | Burkland | |
| 2012/0266937 A1* | 10/2012 | Menon | G02B 27/4266 136/246 |

OTHER PUBLICATIONS

Brimhall et al.; "Breaking the Far-Field Diffraction Limit in Optical Nanopatterning via Repeated Photochemical and Electrochemical Transitions in Photochromic Molecules;" Physical Review Letters (Nov. 2011), vol. 107, 205501.1-205501.5.

Coffey, Valerie; "Multispectral Imaging Moves into the Mainstream;" OPN Optics & Photonics News; vol. 23, Issue 4; Apr. 2012; 18-24.

* cited by examiner

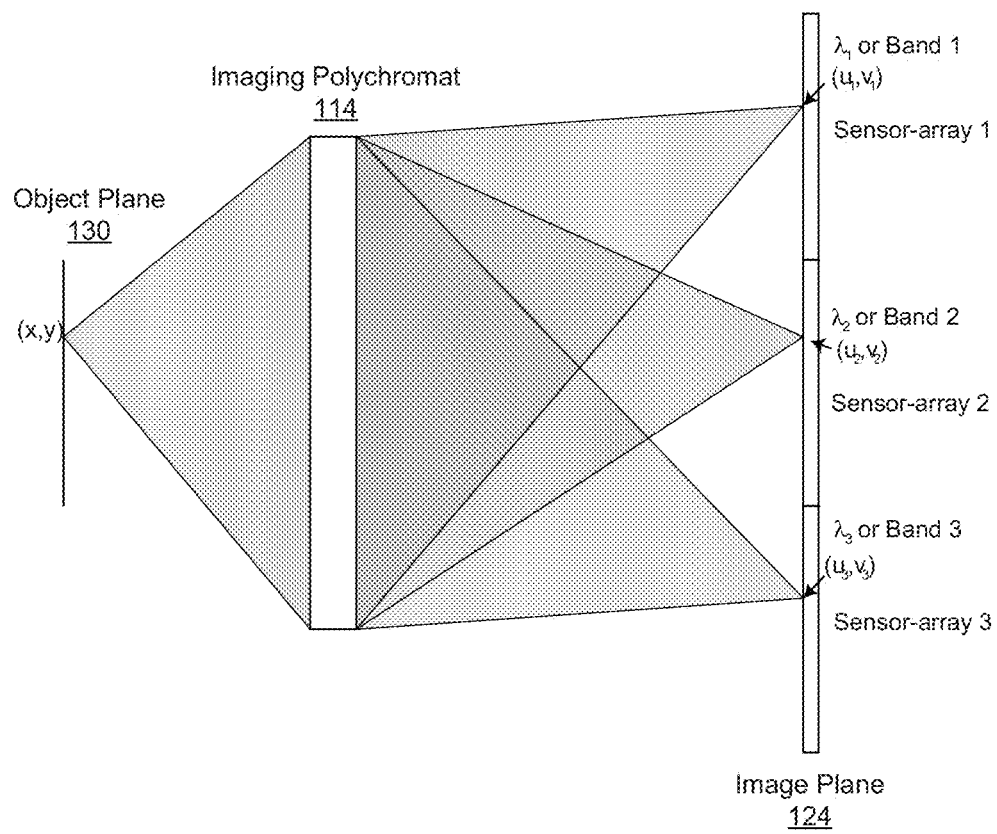
FIG. 3A
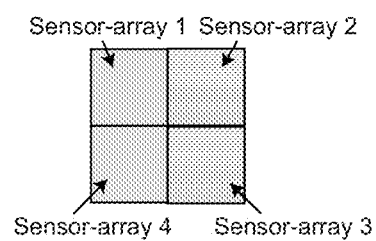 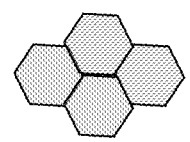
FIG. 3B  FIG. 3C

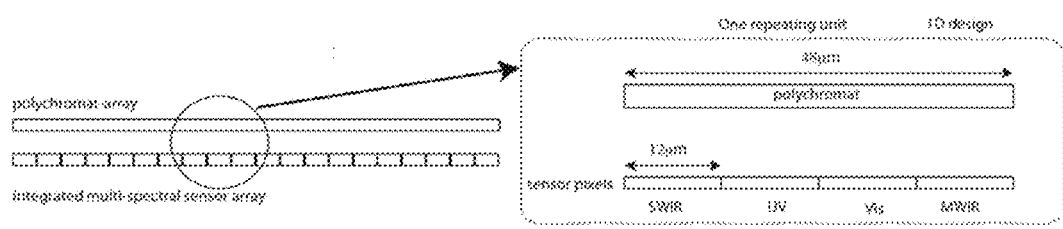
FIG. 6A                    FIG. 6B
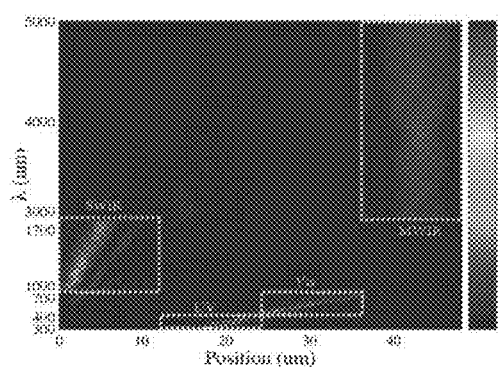   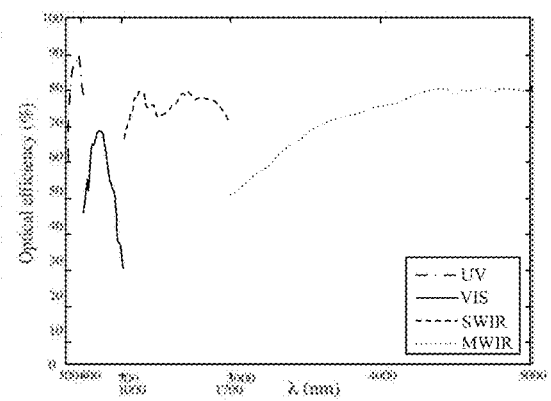
FIG. 6C                    FIG. 6D

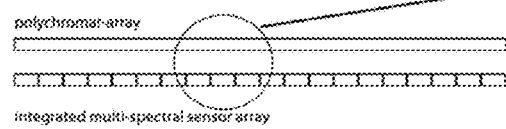 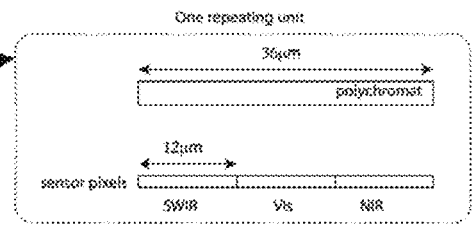
FIG. 8A    FIG. 8B
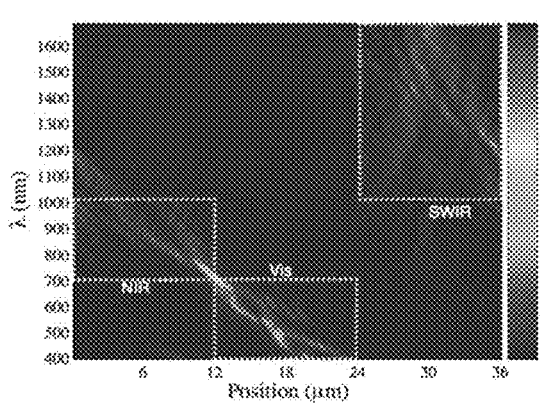 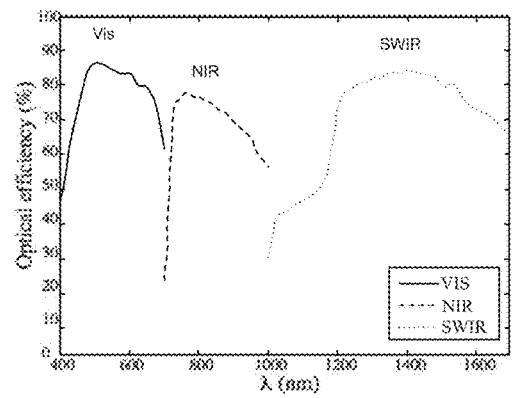
FIG. 8C    FIG. 8D

MULTI-SPECTRAL IMAGING WITH DIFFRACTIVE OPTICS

RELATED APPLICATIONS

This application claims the benefit of and hereby incorporates by reference U.S. Provisional Patent Application Ser. No. 61/732,205, filed Nov. 30, 2012.

FIELD OF THE INVENTION

The present invention relates generally to imaging devices that include diffractive optics (also referred to as a polychromat) and an array of pixels. Accordingly, the present invention involves a multi-spectral imaging (MSI) device capable of imaging with multiple wavelengths (hyper-spectral) or with multiple spectral bands (multi-spectral).

BACKGROUND

Multi-spectral imaging (MSI) can be a technology for generating images in multiple spectral bands. The applications for MSI can range from medical imaging to satellite remote imaging. MSI can be used in scientific and industrial-control applications. MSI can be useful for observing earth for monitoring global climate, agricultural research, forest mapping or monitoring natural and man-made disasters.

SUMMARY OF THE INVENTION

Multi-spectral imaging (MSI) devices, systems, and associated methods are provided. In one aspect, a MSI device can include an imaging plane and a diffractive optic. The imaging plane can include at least two groups of pixels in an array of pixels for sensing at least two spectral bands. The at least two spectral bands can include a first spectral band and a second spectral band. The diffractive optic can be configured for diffracting an electromagnetic wave into the at least two spectral bands and focusing each spectral band component of the electromagnetic wave onto the group of pixels for the spectral band to generate an image (e.g., at least one of a thermal and a reflective image).

In another aspect, a method for MSI using a diffractive optic is provided. Such a method can include diffracting an electromagnetic wave into at least two spectral bands. The spectral bands can include a first spectral band and a second spectral band. Another operation can include focusing each spectral band component of the electromagnetic wave onto a group of pixels on an imaging plane for the spectral band. A further operation can include generating a first image from the group of pixels used to sense the first spectral band, and generating a second image from the group of pixels used to sense the second spectral band. In one specific aspect, the first spectral band is an infrared spectral band including near infrared (NIR), short-wave infrared (SWIR), mid-wave infrared (MWIR), long-wave infrared (LWIR), or intervening bands. In another aspect, the second spectral band includes ultra violet (UV), visible light, or intervening bands.

In yet another aspect, the MSI device can use computer circuitry to provide various functions. For example, the computer circuitry can be configured to diffract an electromagnetic wave into at least two spectral bands. The spectral bands can include a first spectral band and a second spectral band. The computer circuitry can be further adapted to focus each spectral band component of the electromagnetic wave onto a group of pixels on an imaging plane for the spectral band. The computer circuitry can be further configured to generate a first image from the group of pixels used to sense the first spectral band, and generate a second image from the group of pixels used to sense the second spectral band.

There has thus been outlined, rather broadly, the more important features of the disclosure so that the detailed description that follows may be better understood, and so that the present contribution to the art may be better appreciated. Other features of the disclosure will become clearer from the following detailed description of the disclosure, taken with the accompanying drawings and claims, or may be learned by the practice of the disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 3(a) is an illustration of imaging with a polychromat (e.g., diffractive optics) onto multiple discrete sensors in the image plane in accordance with an example.

FIG. 3(b) is an illustration of spatially separated adjacent square shaped sensor arrays.

FIG. 3(c) is an illustration of spatially separated adjacent hexagonal shaped sensor arrays.

FIG. 6A-6D is an illustration of an example multi-spectral imaging (MSI) design with an integrated sensor for short-wave infrared (SWIR), ultra violet (UV), visible (Vis), and mid-wave infrared (MWIR) bands in accordance with an example.

FIG. 8A-8D is an illustration of an example multi-spectral imaging (MSI) design for a 3-band integrated sensor for visible (Vis), near infrared (NIR) and short-wave infrared (SWIR) bands in accordance with an example.

Figure 1:
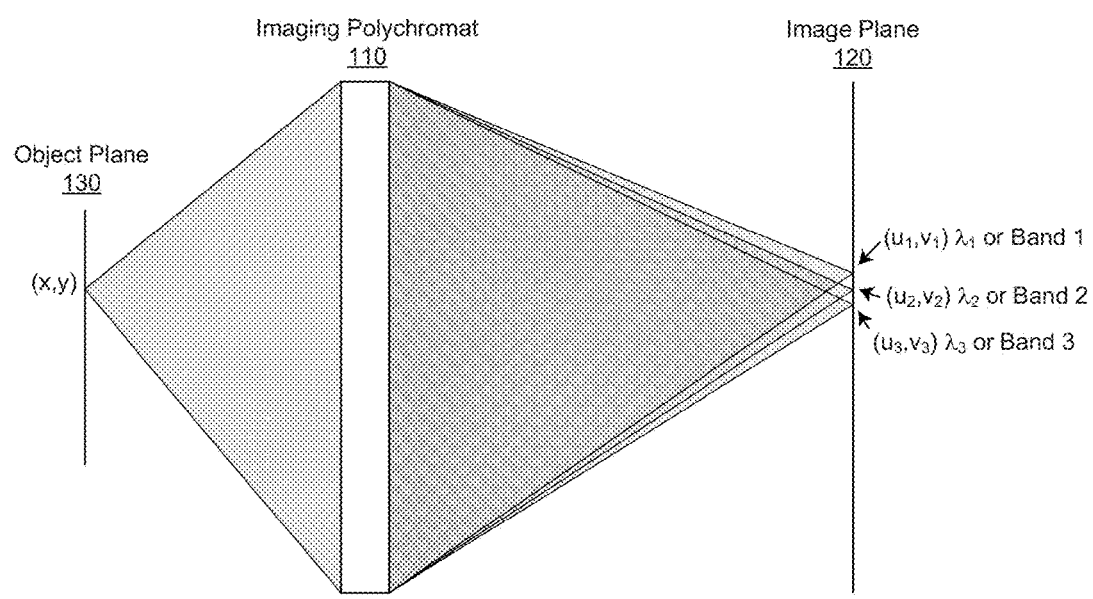
FIG. 1 is an illustration of imaging a plane at multiple wavelengths or spectral bands using a polychromat (e.g., diffractive optics) in accordance with an example.

These drawings merely depict exemplary embodiments of the disclosure, therefore, the drawings are not to be considered limiting of its scope. It will be readily appreciated that the components of the disclosure, as generally described and illustrated in the figures herein, could be arranged, sized, and designed in a wide variety of different configurations. Nonetheless, the disclosure will be described and explained with additional specificity and detail through the use of the accompanying drawings.

DETAILED DESCRIPTION

It is to be understood that this disclosure is not limited to the particular structures, process steps, or materials disclosed, but is extended to equivalents as would be recognized by those ordinarily skilled in the relevant arts. Alterations and further modifications of the illustrated features, and additional applications of the principles of the examples, which would occur to one skilled in the relevant art and having possession of this disclosure, are to be considered within the scope of the disclosure. It should also be understood that terminology employed herein is used for the purpose of describing particular embodiments only and is not intended to be limiting. The same reference numerals in different drawings represent the same element.

It must be noted that, as used in this specification and the appended claims, the singular forms "a," "an," and "the" include plural referents unless the context clearly dictates otherwise. Thus, for example, reference to "a band" includes one or more of such features, reference to "pixels" includes reference to one or more of such pixels, and reference to "increasing" includes one or more of such steps.

Definitions

In describing and claiming the present disclosure, the following terminology will be used in accordance with the definitions set forth below.

As used herein, "substantial" when used in reference to a quantity or amount of a material, or a specific characteristic thereof, refers to an amount that is sufficient to provide an effect that the material or characteristic was intended to provide. Therefore, "substantially free" when used in reference to a quantity or amount of a material, or a specific characteristic thereof, refers to the absence of the material or characteristic, or to the presence of the material or characteristic in an amount that is insufficient to impart a measurable effect, normally imparted by such material or characteristic.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without any indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or subranges encompassed within that range as if each numerical value and sub-range is explicitly recited. As an illustration, a numerical range of "about 0.6 mm to about 0.3 mm" should be interpreted to include not only the explicitly recited values of about 0.6 mm and about 0.3 mm, but also include individual values and sub-ranges within the indicated range. Thus, included in this numerical range are individual values such as 0.4 mm and 0.5, and sub-ranges such as from 0.5-0.4 mm, from 0.4-0.35, etc. This same principle applies to ranges reciting only one numerical value. Furthermore, such an interpretation should apply regardless of the breadth of the range or the characteristics being described.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art. Further, unless otherwise stated, the term "about" shall expressly include "exactly," consistent with the discussion above regarding ranges and numerical data.

In the present disclosure, the term "preferably" or "preferred" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the disclosure should be determined solely by the appended claims and their legal equivalents, rather than by the descriptions and examples given herein.

EXAMPLES OF THE INVENTION

A multi-spectral imaging (MSI) device can include a diffractive optic, also referred to as a polychromat, and an array of pixels. The imaging device can be capable of imaging with multiple wavelengths (i.e., hyper-spectral) or with multiple spectral bands (i.e., multi-spectral). The MSI device with the diffractive optic can have a simpler design using less optics and can be manufactured with lower cost than other MSI devices because the optics can be manufactured using large-volume processes and the MSI device can enable a high resolution and high signal-to-noise ratio (SNR). In addition, a single optic can be used to diffract multiple spectral bands to different sensors. The diffractive optic can use materials, configurations, and/or processes as shown and described in U.S. patent application Ser. No. 13/274,903 to Rajesh Menon, et al., entitled "Diffractive Optic," filed Oct. 17, 2011, which is herein incorporated by reference in its entirety.

Diffraction refers to various phenomena which occur when a wave encounters an obstacle. The diffractive optic can utilize such diffraction phenomena. The diffraction phenomenon can be described as the apparent bending of waves around small obstacles and the spreading out of waves past small openings. Diffractive effects can occur when a light wave travels through a medium with a varying refractive index (e.g., air or a transparent substrate). Diffraction can occur with all types of waves, including sound waves and electromagnetic waves, such as visible light, infrared, X-rays, and radio waves.

A signal-to-noise ratio (SNR or S/N) can be a measure that compares the level of a desired signal to the level of background noise. The SNR can be defined as the ratio of signal power to the noise power, often expressed in decibels (dB). The SNR can be used in imaging as a physical measure of the sensitivity of an imaging system (e.g., digital, film, or imaging device).

Multi-spectral imaging (MSI) can be a technology for generating images in multiple spectral bands. The applications for MSI can range from medical imaging to satellite remote imaging. Some spectral bands of interest for imaging are: visible (wavelength ($\lambda$) of 0.4 micrometers ($\mu$m) or microns—0.7 $\mu$m), near infrared (NIR; 0.7 $\mu$m-1 $\mu$m), short-wave infrared (SWIR; 1 $\mu$m-1.7 $\mu$m), mid-wave infrared (MWIR; $\lambda$ of 3.5 $\mu$m-5 $\mu$m) or long-wave infrared (LWIR; $\lambda$ of 8 $\mu$m-12 $\mu$m). Other spectral bands for imaging can also be used.

The technology (e.g., MSI device, methods, computer circuitry, and systems) as described herein can be applicable to any arbitrary spectral bands or even discrete wavelengths. In an example, the NIR and SWIR bands can be combined to get thermal and reflective images simultaneously, which can be useful for low-light operations, such as night-vision. Such technologies can be used in remote vehicles, automated cars, intelligence, surveillance, or reconnaissance. In an example, reflective images can be created from visible, NIR, and SWIR bands. In another example, MWIR and LWIR can be used to image the blackbody (e.g., thermal) radiation from a target. In an example, wavelengths in the band 2 $\mu$m-3.5 $\mu$m can be used for detection of explosives or chemicals. MSI can also be used in scientific and industrial-control applications. MSI can also be useful for observing the Earth for monitoring global climate, agricultural research, forest mapping or monitoring natural and man-made disasters. Red, green and NIR bands can be particularly useful for mapping vegetation.

Conventional MSI systems can use either multiple-input apertures or a single shared-input aperture. Multiple-aperture systems can use separate optics and sensor for each band. The optical design may be simple for each spectral band, but the integration costs to combine the spectral bands can be high (e.g., packaging of multiple optical systems can be complicated) and the field-of-view can be limited. The field of view (or field of vision (FOV)) is the extent that the observable world that can be seen or captured at any given moment. The field of view can be indicated by the angle (e.g., 60 degrees or 180°) observed or captured by an individual or device.

Shared-aperture systems on the other hand can use complex optics to work efficiently at multiple spectral bands. Designing optics that can achieve high optical efficiencies over the multiple wavelengths and spectral bands can be expensive. Shared-aperture systems can be bulky and heavy. The technology disclosed herein can be used to fabricate cheaper and lighter shared-aperture systems, while maintaining high optical signal-to-noise ratios for many wavelengths or spectral bands. In an example, a common sensor array can be used for various spectral bands, such as both MWIR and SWIR bands. Further, the diffractive optic can be a single diffractive optic element having integrated features within a common custom formed optical element to generate the various spectral bands.

FIG. 1 illustrates an imaging polychromat 110 (e.g., diffractive optics) used to capture a MSI of an object plane 130 on an image plane 120 (or imaging plane). Each point on the object plane (x,y) can be mapped to multiple points in the image plane, such as $(u_1, v_1)$, $(u_2, v_2)$, $(u_3, v_3)$ for three spectral bands (e.g., band 1, 2, or 3). Each point in the image plane can represent a certain wavelength or spectral band of interest (e.g., band 1, 2, or 3) for a specified point on the object plane. A sensor in the image plane that is composed of inter-digitated multi-wavelength sensors can allow electronic capture or read out a multi-spectral image. Capture of the multi-spectral image can include visible light spectral bands, which can be used for color imaging. For instance, the use of conventional color filters can be avoided, which can save manufacturing costs and also increase the image brightness. For example, the red, green and blue bands from each object point can get assigned to spatially separate but adjacent pixels on the sensor (e.g., FIG. 1) or spatially separate pixels on the separate sensors (e.g., FIG. 3). The sensors can use technology such as charge-coupled devices (CCD) or complementary metal oxide semiconductors (CMOS).

Figure 2:
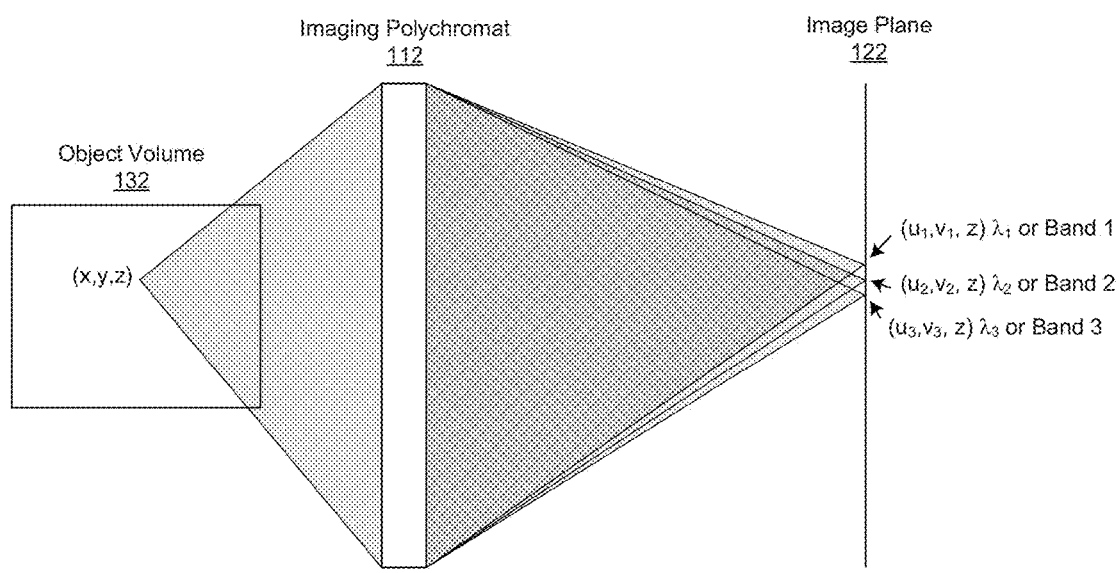
FIG. 2 is an illustration of imaging a three dimensional (3D) volume at multiple wavelengths or spectral bands using a polychromat (e.g., diffractive optics) in accordance with an example.

FIG. 2 illustrates imaging of a three dimensional (3D) volume at multiple wavelengths or spectral bands using a polychromat 112 (e.g., diffractive optics). For example, a point in an object volume 132 (x,y,z) can be mapped onto multiple points on an image plane 122, where each point corresponds to multiple wavelengths or spectral bands. Since the points in the 3D object volume can be mapped onto a two dimensional (2D) image plane, the sensor array on the image plane can use many more pixels to encode each 2D plane (e.g., z plane) so the object is mapped accurately in 3D.

FIG. 3(a)-3(c) illustrates a polychromat 114 design using discrete image sensors that can be used for each wavelength or spectral band (e.g., $\lambda_1$ or band 1, $\lambda_2$ or band 2, or $\lambda_3$ or band 3) in the image plane 124. In FIG. 3(a), the polychromat maps light (i.e., electromagnetic wave) from each point (x,y) of the object plane onto 3 points—one point on each of the 3 discrete sensor arrays (e.g., sensor-array 1, 2, 3, or 4). The polychromat design shown in FIG. 3(a) can use existing sensor arrays, but the size, design, and fabrication of the polychromat may differ from an integrated sensor array. The sensor arrays may be tiled in the 2D image plane in a variety of ways, such as square arrays (e.g., FIG. 3(b)) or hexagonal close packing arrays (e.g., 3(c)). In another example, smaller discrete sub-arrays (or group of pixels) may be used for a small section or area of the image plane (e.g., FIGS. 3(b) and 3(c)), so each discrete sub-array for the various spectral band can be tiled with other discrete sub-array for capturing the entire image. The architecture in FIG. 3(a) can also be extended to an image volume, similar to the volume shown in FIG. 2.

Figure 4:
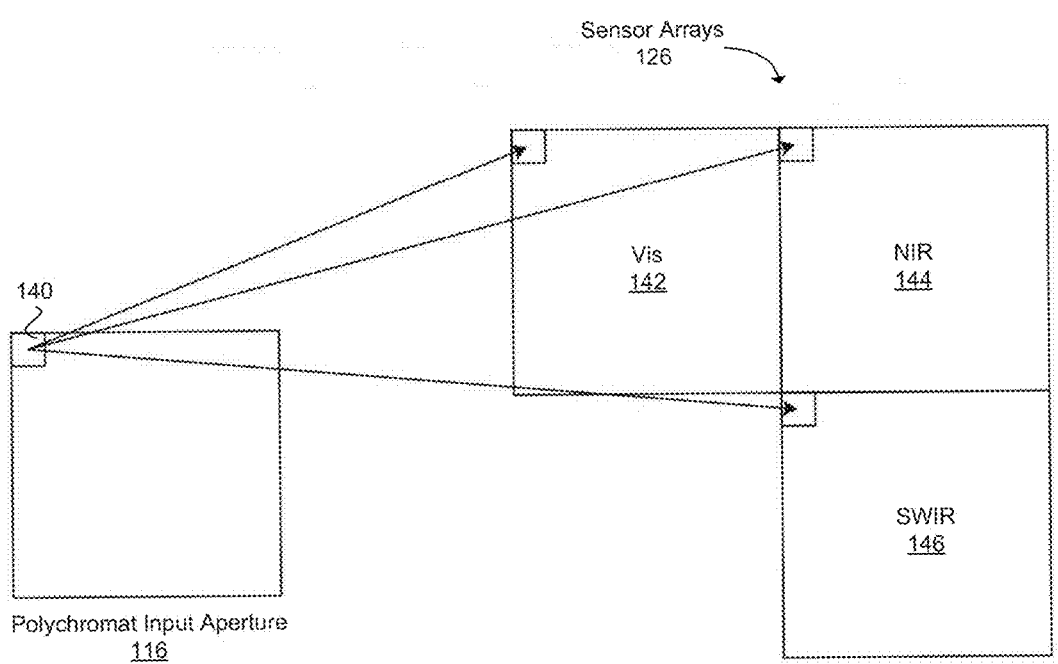
FIG. 4 is an illustration of two dimensional (2D) design of a multi-spectral imager (e.g., diffractive optics) with discrete sensor arrays in accordance with an example.

FIG. 4 illustrates a schematic of a 2D design that is comprised of a polychromat, which can define the input aperture 116, and 3 discrete sensor arrays. The schematic illustrates the pixels in discrete sensor arrays for the visible (Vis) 142, NIR 144, and SWIR 146 bands representing a point of an object. A small square on the upper left corner 140 represents one sub-polychromat that redirects the 3 spectral bands to corresponding pixels 142, 144, and 146 on each sensor. A sub-polychromat can represent a single image point and direct the waves for each spectral band to the corresponding pixels 142, 144, and 146. The location of each sensor array can be chosen in a variety of ways to enhance performance of the final device.

Figure 5:
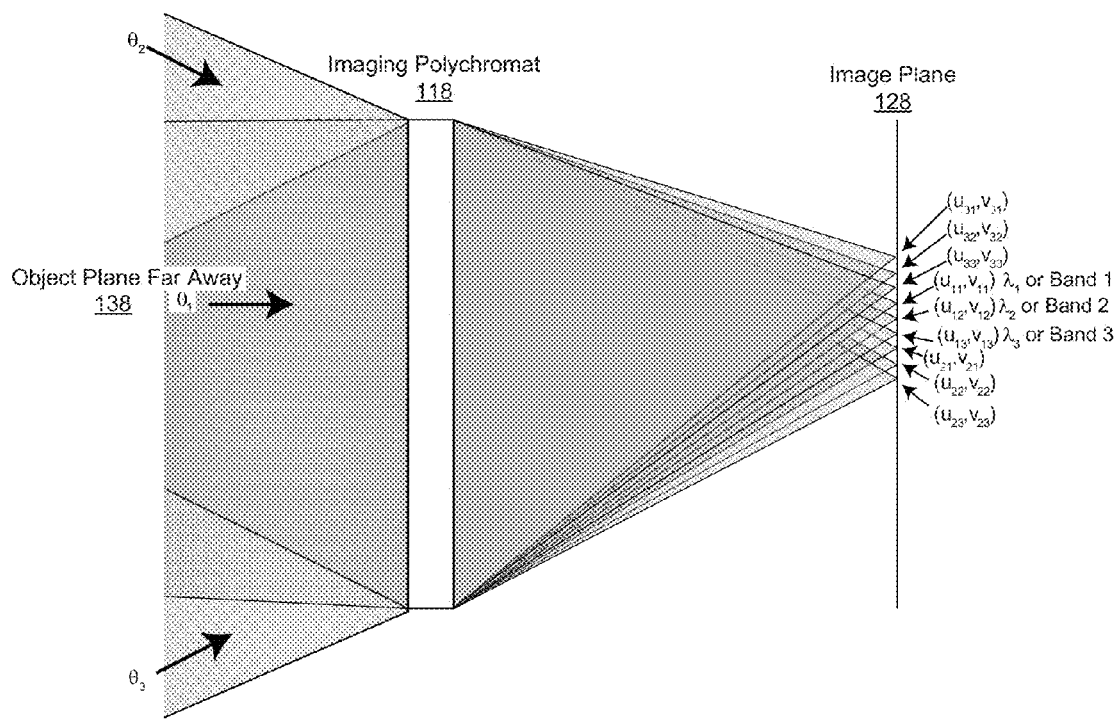
FIG. 5 is an illustration of imaging a far-away object using polychromat (e.g., diffractive optics) in accordance with an example.

The object to be captured by the MSI device can be far or near to the polychromat. Referring generally to FIG. 5, if the object is far 138 compared to the wavelengths of interest and the aperture of the polychromat 118, then incoming light can be treated as plane waves with different incident angles (e.g., $\theta_1$, $\theta_2$, or $\theta_3$). The polychromat can be designed such that each incident plane wave of a given incident angle can get mapped onto multiple points on the sensor array (or image plane 128) such that each point represents one wavelength of spectral band and the given incident angle (e.g., pixel ($u_{21}$, $v_{21}$) for incident angle $v_2$ and $\lambda_1$ (or band 1)). Mapping and capturing multi-spectral images based on incident angles can be useful for satellite imaging, astronomy, or other far away objects. Capturing multi-spectral images can also be applied to discrete sensors (as previously illustrated in FIG. 3(a)-(c)).

The calculation of the image using plane waves with different incident angles (i.e., non-collimated input waves) can be different from an image using collimated light. For instance, if a point is being imaged, then the input wave can be comprised of spherical waves for each wavelength of interest. A spherical wave can be wave propagated from a single point. Any complex wavefront can be considered as input for the MSI device.

The optical systems illustrated can be combined with other refractive, reflective or diffractive optical systems. For instance, the MSI device can be useful to perform optical zoom. Further, different materials can be used for the substrate of the polychromat (e.g., diffractive optics) to accommodate the different spectral ranges. For example, crystalline silicon may work well for spectral band with wavelengths up to 1.1 microns. Amorphous silicon may work well for spectral band with wavelengths above 1.1 microns. Different materials with various bandgaps can be used. For diffractive optic, the cells can be made of the same material. For example, the polychromat material can include a transparent plastic, such as photoresist, polymethylmethacrylate (PMMA), or other polymer that are transparent to the wavelengths of interest. The polychromat material can also be easily fabricated into the multiple height levels. The polychromat material can also include glass, fused silica, silica, quartz, fused quartz, or similar materials. The substrate can include PMMA, iterative pixelated perturbation method (IPPM) material, glass, fused silica, fused quartz, silica, quarts or any material that can provide a rigid support and also be transparent at the wavelengths of interest. If the diffractive optics is used in reflection, the substrate can be highly reflective at the wavelengths of interest instead of being transparent.

Figure 6E:
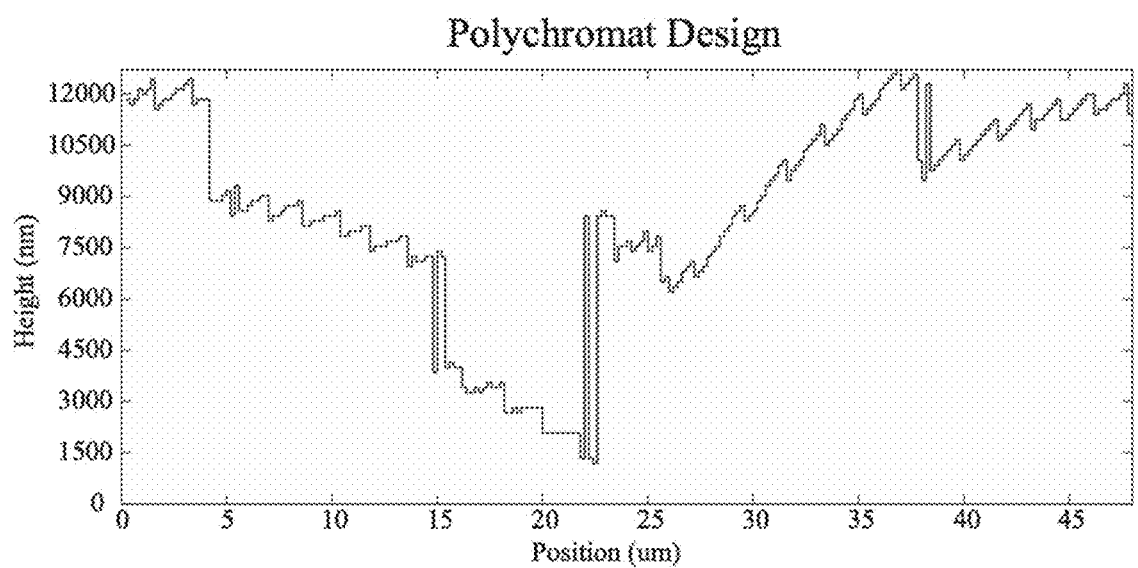
FIG. 6E is an illustration of an example one dimensional (1D) design of a multi-spectral imager for an integrated sensor with short-wave infrared (SWIR), ultra violet (UV), visible (Vis), and mid-wave infrared (MWIR) bands in accordance with an example.

FIG. 6A-6E shows an example MSI design with an integrated sensor pixels for ultra violet (UV), visible (Vis or VIS), short-wave infrared (SWIR), and mid-wave infrared (MWIR) bands. FIG. 6A illustrates a one dimensional (1D) view of a polychromat array and an integrated multi-spectral sensor array with sensor pixels. FIG. 6B illustrates an expanded view of a section of FIG. 6A, which repeating unit (or section) can be repeated in 1D or 2D. Depending on the design the size of each sensor pixel can be larger or smaller than 12 µm. In another example, the repeating units can be configured in a 2D pattern as illustrated in FIGS. 3(b) and 3(c). Each sensor pixel can have a length or width of approximately 12 µm (microns). The polychromat for a set of multi-spectral imaging sensor pixels can be 48 µm. Depending on the design the size of the polychromat repeating unit can be larger or smaller than 48 µm. FIG. 6C illustrates a multi-spectral pixel image for the UV, Vis, SWIR, and MWIR bands based on position (µm) in the sensor array and FIG. 6D illustrates multi-spectral optical efficiency (in percentages (%)) for each of the bands (e.g., UV, Vis, SWIR, and MWIR bands) in the MSI design shown in FIG. 6E. The polychromat can concentrate specific electromagnetic waves in a spectral band on to the specified sensor. The UV band can have a wavelength ($\lambda$) of approximately (~) 300 nanometers (nm)-400 nm, the VIS band can have a $\lambda$ of ~400 nm-700 nm, the SWIR band can have a $\lambda$ of ~1000 nm-1700 nm, and the MWIR band can have a $\lambda$ of ~3000 nm-5000 nm. FIG. 6E illustrates the change height (in nm) of a polychromat substrate for each position (in µm) in a 1D polychromat design. The polychromat can be designed to take incoming collimated (or non-collimated) light and assign the UV, Vis, SWIR, and MWIR bands to adjacent sensor pixels as illustrated FIG. 6A-6D, resulting in the image shown in FIG. 6C. The optical efficiency as a function of wavelength of the polychromat is shown in FIG. 6D, which illustrates that relatively high efficiencies can be achieved for all the selected bands using a MSI device.

Figures 7A, 7B:
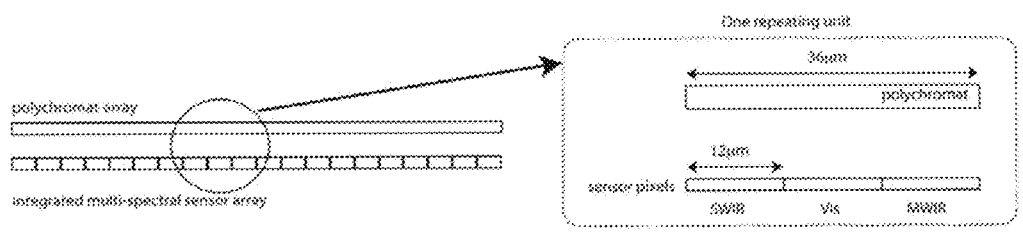
FIG. 7A-7D is an illustration of an example multi-spectral imaging (MSI) design with an integrated sensor for short-wave infrared (SWIR), visible (Vis), and mid-wave infrared (MWIR) bands in accordance with an example.
Figures 7C, 7D:
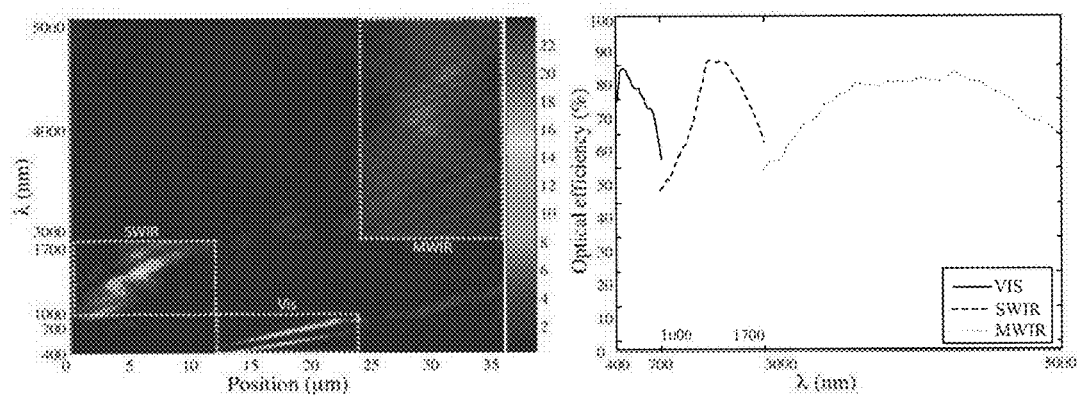
Figure 7E:
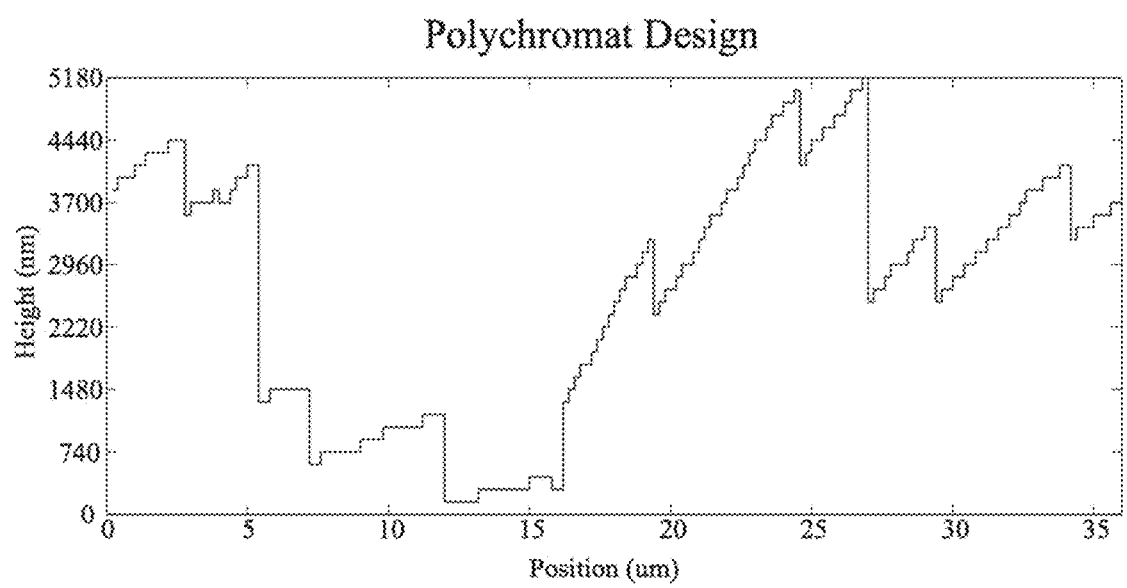
FIG. 7E is an illustration of an example one dimensional (1D) design of a multi-spectral imager for an integrated sensor with short-wave infrared (SWIR), visible (Vis), and mid-wave infrared (MWIR) bands in accordance with an example.

FIG. 7A-7D shows a MSI design with an integrated sensor for three bands, including VIS, SWIR, and MWIR bands. FIG. 7A illustrates a 1D view of a polychromat array and an integrated multi-spectral sensor array with sensor pixels. FIG. 7B illustrates an exploded view of a section of FIG. 7B, which repeating unit (or section) can be repeated in 1D or 2D. Each sensor pixel can have a length or width of approximately 12 µm (microns). Depending on the design the size of each sensor pixel can be larger or smaller than 12 µm. The polychromat for a set of multi-spectral imaging sensor pixels can be 36 µm. Depending on the design the size of the polychromat repeating unit can be larger or smaller than 36 µm. FIG. 7C illustrates a multi-spectral pixel image for the VIS, SWIR, and MWIR bands based on position (µm) in the sensor array and FIG. 7D illustrates multi-spectral optical efficiency (in percentages (%)) for each of the bands (e.g., Vis, SWIR, and MWIR bands) in the MSI design shown in FIG. 7E. The polychromat can concentrate specific electromagnetic waves in a spectral band on to the specified sensor. FIG. 7E illustrates the change height (in nm) of a polychromat substrate for each position (in µm) in a 1D polychromat design. The polychromat can be designed to take incoming collimated (or non-collimated) light and assign the VIS, SWIR, and MWIR bands to adjacent sensor pixels as illustrated FIG. 7A, resulting in the image shown in FIG. 7C. The optical efficiency as a function of wavelength of the polychromat is shown in FIG. 7D, which illustrates that relatively high efficiencies can be achieved for all the selected bands using a MSI device.

Figure 8E:
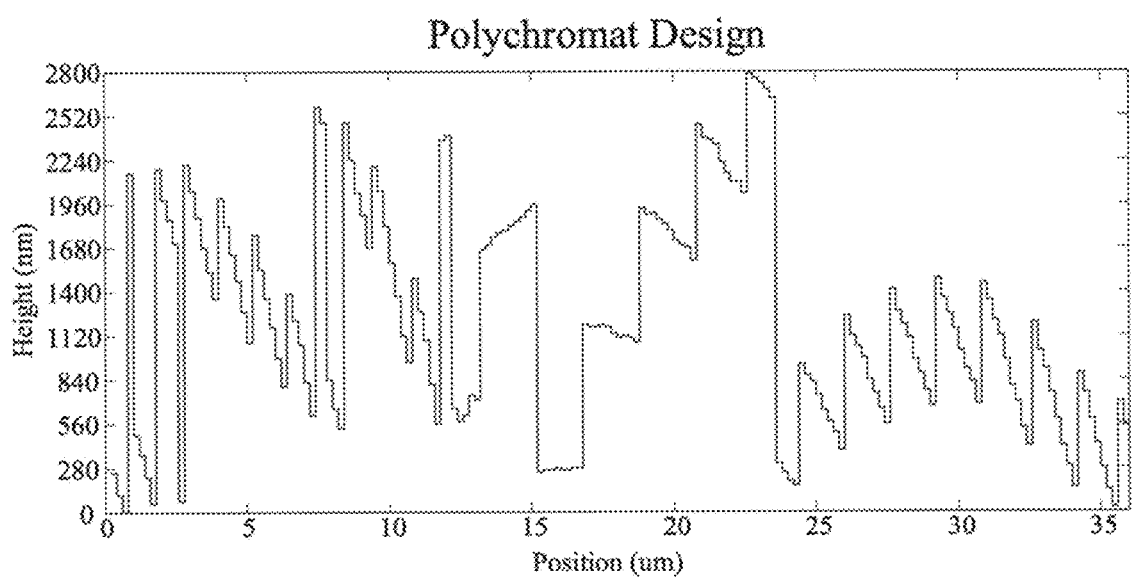
FIG. 8E is an illustration of an example one dimensional (1D) design of a multi-spectral imager for a 3-band integrated sensor with visible (Vis), near infrared (NIR) and short-wave infrared (SWIR) bands in accordance with an example.

FIG. 8A-8D shows a MSI design with an integrated sensor for three bands, including VIS, NIR, and SWIR bands. FIG. 8A illustrates a 1D view of a polychromat array and an integrated multi-spectral sensor array with sensor pixels. FIG. 8B illustrates an exploded view of a section of FIG. 8A, which repeating unit (or section) can be repeated in 1D or 2D. Each sensor pixel can have a length or width of approximately 12 µm (microns). Depending on the design the size of each sensor pixel can be larger or smaller than 12 µm. The polychromat for a set of multi-spectral imaging sensor pixels can be 36 µm. Depending on the design the size of the polychromat repeating unit can be larger or smaller than 36 µm. FIG. 8C illustrates a multi-spectral pixel image for the Vis, NIR, and SWIR bands based on position (µm) in the sensor array and FIG. 8D illustrates multi-spectral optical efficiency (in percentages (%)) for each of the bands (e.g., Vis, NIR, and SWIR bands) in the MSI design shown in FIG. 8E. The polychromat can concentrate specific electromagnetic waves in a spectral band on to the specified sensor. The VIS band can have a λ of ~400 nm-700 nm, the NIR band can have a λ of ~700 nm-1000 nm, and the SWIR band can have a λ of 1000 nm-1700 nm. FIG. 7E illustrates the change height (in nm) of a polychromat substrate for each position (in μm) in a 1D polychromat design. The polychromat can be designed to take incoming collimated (or non-collimated) light and assign the VIS, NIR, and SWIR bands to adjacent sensor pixels as illustrated FIG. 8A, resulting in the image shown in FIG. 8C. The optical efficiency as a function of wavelength of the polychromat is shown in FIG. 8D, which illustrates that relatively high efficiencies can be achieved for all the selected bands using a MSI device.

Each cell in an array of cells of the polychromat can be optimized for the optical efficiency each pixel of the sensor array. The calculation for imaging of the metric for optimization can be based on a least-squares error of the images (at the different wavelengths or bands) from the desired images. Then, a normalized mean error can be used as single objective for minimization.

Figure 9A:
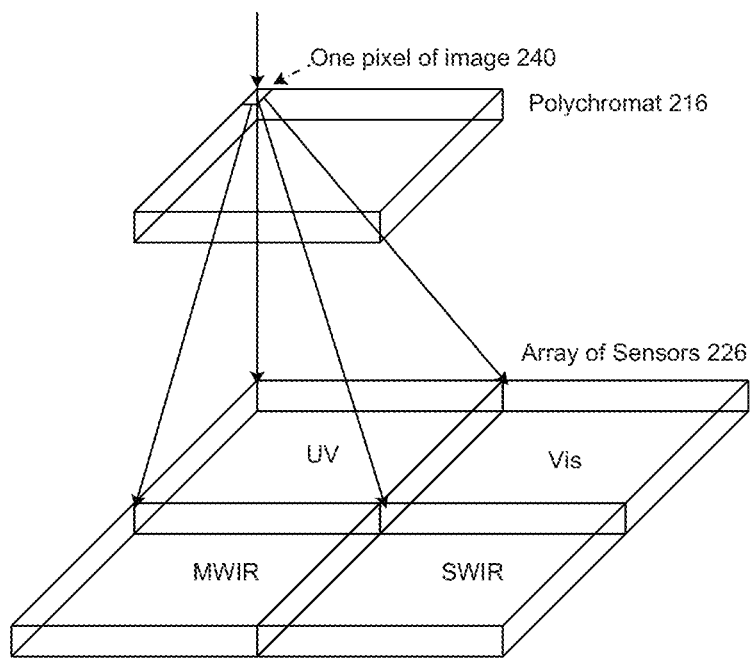
FIG. 9A is an illustration of an example design result for a multi-spectral imager (e.g., diffractive optics) and a 4-band discrete sensor in accordance with an example.
Figure 9B:
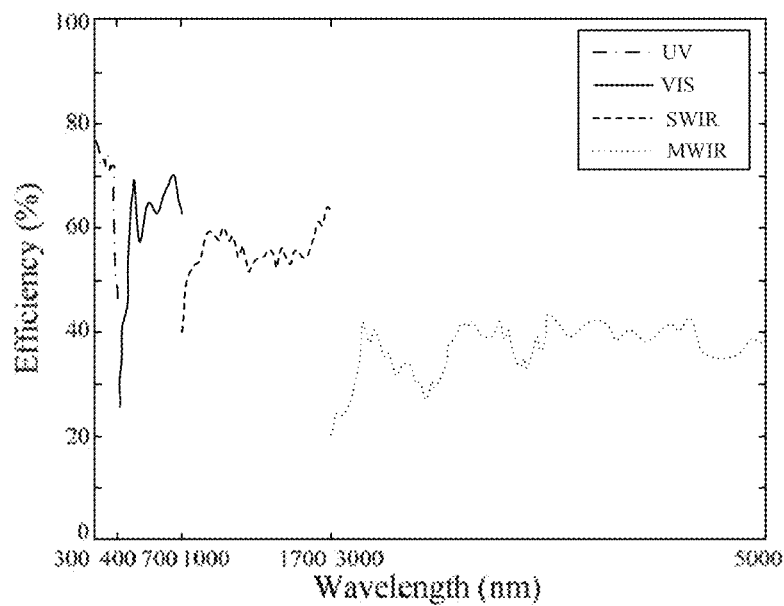
FIG. 9B is a graph of efficiency as a function of wavelength for the design result of FIG. 9A.

FIG. 9A illustrates a design for a MSI device that utilizes four discrete sensors for four bands (e.g., UV, Vis, SWIR, and MWIR). The light incident on each "image-pixel" 240 can get re-directed by the corresponding region of the polychromat 216 onto an "image-pixel" on each of the four detectors (or sensors) in the sensor array 226. Each spectral band can be assigned to the correct sensor. FIG. 9B illustrates the optical efficiency as a function of wavelength of the polychromat using discrete sensors for each spectral band, which illustrates that efficiencies for discrete sensors may be lower than the efficiencies for an integrated multi-spectral sensor array (as shown in FIGS. 6A, 7A, and 8A). The loss of efficiency can be due to the addition spacing between the polychromat and discrete sensor, whereas the spacing between the polychromat and the integrated multi-spectral sensor array can be closer.

Referring back to FIG. 1, a multi-spectral imaging (MSI) device can include an imaging plane 120 and a diffractive optic 110. The imaging plane can include at least two groups of pixels in an array of pixels for sensing at least two spectral bands. The at least two spectral bands can include a first spectral band and a second spectral band. In an example, the MIs device can include a single shared-input aperture. The first spectral band can include an infrared spectral band including near infrared (NIR), short-wave infrared (SWIR), mid-wave infrared (MWIR), long-wave infrared (LWIR), or intervening bands. The second spectral band can include ultra violet (UV), visible light, near infrared (NIR), short-wave infrared (SWIR), mid-wave infrared (MWIR), or long-wave infrared (LWIR).

In another example, the diffractive optic focus the first spectral band component of the electromagnetic wave on to addressable pixels of a first sensor, and the diffractive optic can focus the second spectral band component of the electromagnetic wave on to addressable pixels of a second sensor. An aperture of the diffractive optic can redirect incoming light from a plurality of plane waves. Each plane wave can have a different incident angle, and the imaging plane can have a plurality of addressable pixels. Each addressable pixel can be based on the incident angle of a plane wave and a spectral band (e.g., FIG. 5).

In another configuration, the group of pixels for the first spectral band and the group of pixels for second spectral band can use different discrete sensor arrays on the imaging plane (e.g., FIG. 3, 4, or 9A). In another example, the pixels for the first spectral band and the pixels for second spectral band can use adjacent sensor pixels on the imaging plane (e.g., FIG. 1, 2, 5, 6A, 7A, or 8A). The imaging plane can be used to generate a separate first spectral band image and at least a second spectral band image (e.g., FIG. 2). Each image can be a representation of a three dimensional (3D) or two dimensional (2D) object. The diffractive optic can include an array of pixelated cells (or areas) on a substrate, where each cell has an aberration with a varying height from neighboring cells.

Figure 10:
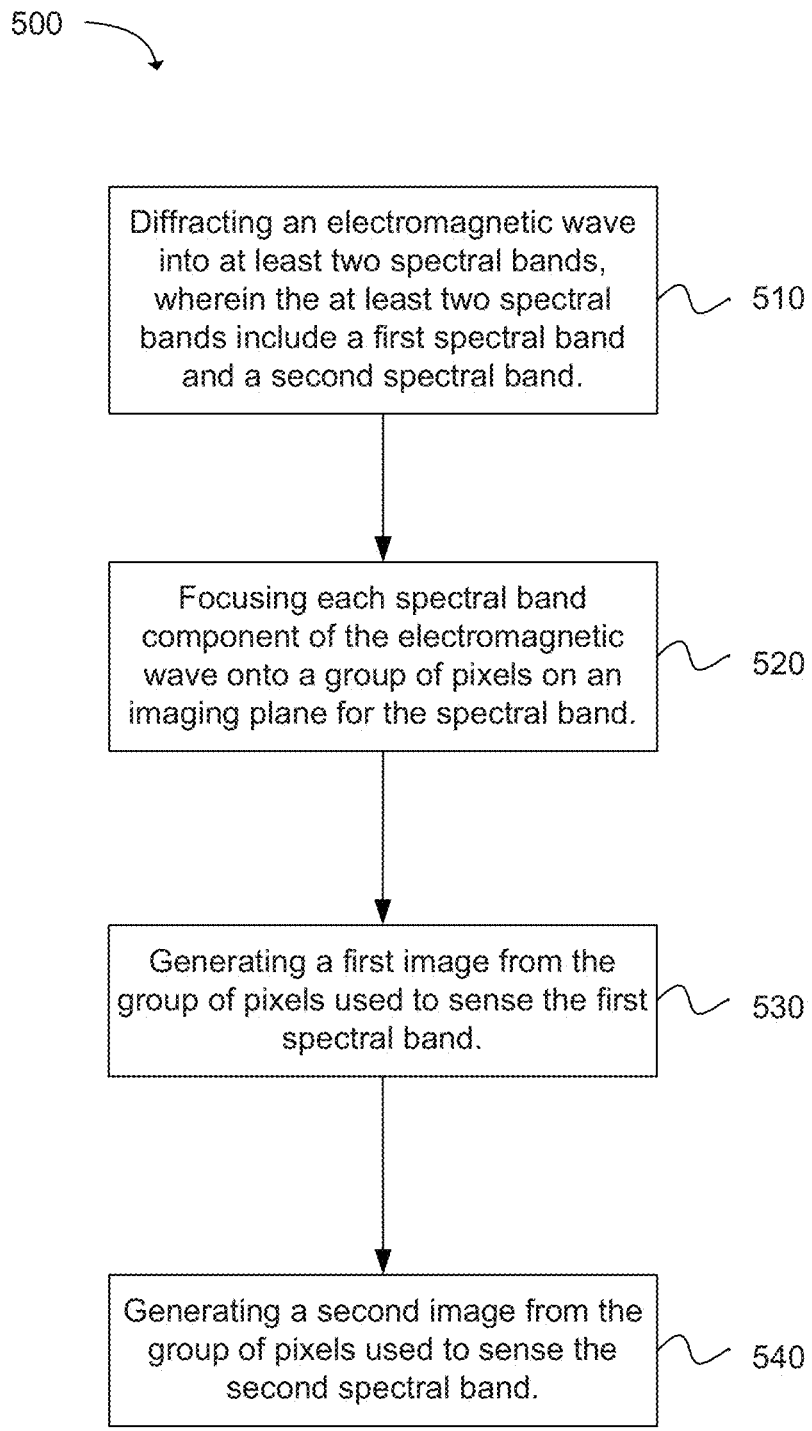
FIG. 10 depicts a flow chart of a method for multi-spectral imaging (MSI) using a diffractive optic in accordance with an example.

Another example provides a method 500 for multi-spectral imaging (MSI) using a diffractive optic, as shown in the flow chart in FIG. 10. The method can be executed as instructions on a machine, computer circuitry, or a processor, where the instructions are included on at least one computer readable medium or one non-transitory machine readable storage medium. The method includes the operation of diffracting an electromagnetic wave into at least two spectral bands, wherein the at least two spectral bands include a first spectral band and a second spectral band, as in block 510. The operation of focusing each spectral band component of the electromagnetic wave onto a group of pixels on an imaging plane for the spectral band follows, as in block 520. The next operation of the method can be generating a first image from the group of pixels used to sense the first spectral band, as in block 530. The method can further include generating a second image from the group of pixels used to sense the second spectral band, as in block 540.

In another example, the first spectral band can be an infrared spectral band including near infrared (NIR), short-wave infrared (SWIR), mid-wave infrared (MWIR), long-wave infrared (LWIR), or intervening bands. The second spectral band can include ultra violet (UV), visible light, or intervening bands. In another configuration, the operation of focusing each spectral band component of the electromagnetic wave can further include: focusing the first spectral band component of the electromagnetic wave on to addressable pixels of a first sensor, and focusing the second spectral band component of the electromagnetic wave on to addressable pixels of a second sensor. The group of pixels for the first spectral band and the group of pixels for second spectral band can use different discrete sensor arrays on the imaging plane. In another example, the pixels for the first spectral band and the pixels for second spectral band use adjacent sensor pixels on the imaging plane. The first image and the second image represents a three dimensional (3D) or two dimensional (2D) object. In another configuration, the operation of diffracting the electromagnetic wave into at least two spectral bands can further include collimating incoming light from a plurality of plane waves. Each plane wave can have a different incident angle, and the imaging plane can have a plurality of addressable pixels. Each addressable pixel can be based on the incident angle of a plane wave and a spectral band.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The switch may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A multi-spectral imaging (MSI) device, comprising:
an imaging plane with at least two groups of pixels in an array of pixels for sensing at least two spectral bands, wherein the at least two spectral bands include a first spectral band and a second spectral band; and a diffractive optic for diffracting an electromagnetic wave into the at least two spectral bands and focusing each spectral band component of the electromagnetic wave onto the group of pixels for the spectral band to generate image,
wherein an aperture of the diffractive optic redirects incoming light from a plurality of plane waves, wherein each plane wave has a different incident angle, and the imaging plane has a plurality of addressable pixels, wherein each addressable pixel is based on the incident angle of a plane wave and a spectral band.

2. The MSI device of claim 1, further comprising a single shared-input aperture.

3. The MSI device of claim 1, wherein the first spectral band is an infrared spectral band including at least one of near infrared (NIR), short-wave infrared (SWIR), mid-wave infrared (MWIR), long-wave infrared (LWIR), and intervening bands.

4. The MSI device of claim 1, wherein the second spectral band includes at least one of ultra violet (UV), visible light, near infrared (NIR), short-wave infrared (SWIR), midwave infrared (MWIR), or long-wave infrared (LWIR).

5. The MSI device of claim 1, wherein the pixels for the first spectral band and the pixels for second spectral band use adjacent sensor pixels on the imaging plane.

6. The MSI device of claim 1, wherein the diffractive optic includes an array of pixelated cells on a substrate, where each cell has an aberration with a varying height from neighboring cells.

* * * * *